April 25, 1961  A. P. KRUEGER  2,981,210
SYSTEM OF TRANSPORT FOR TRAILERS
Filed Nov. 23, 1956  3 Sheets-Sheet 2
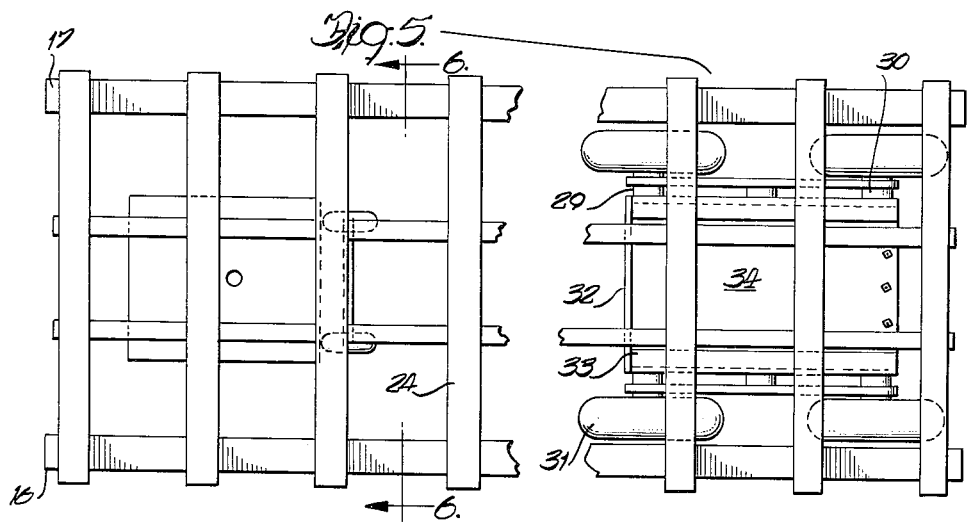
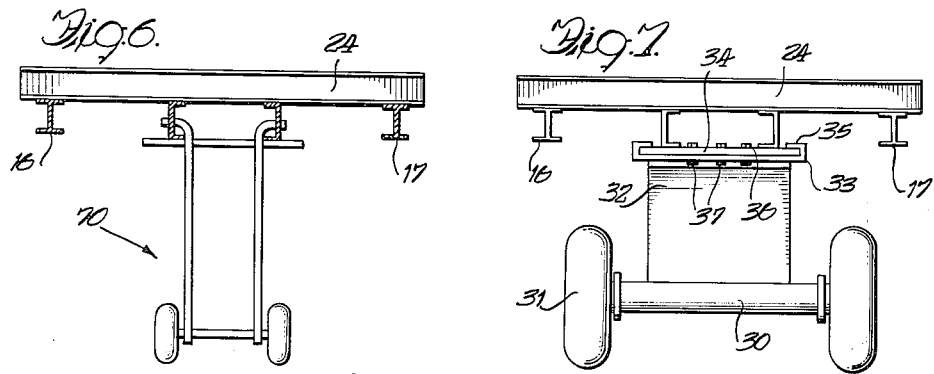
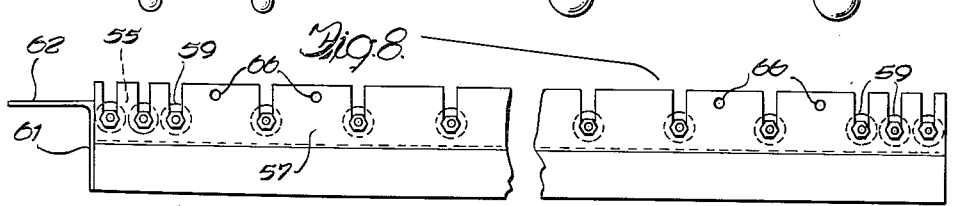
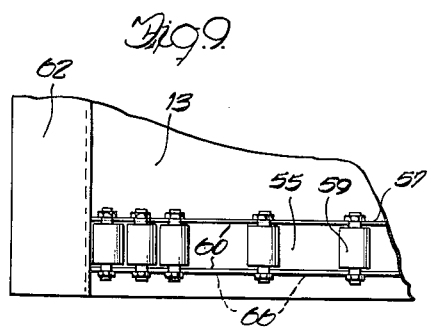
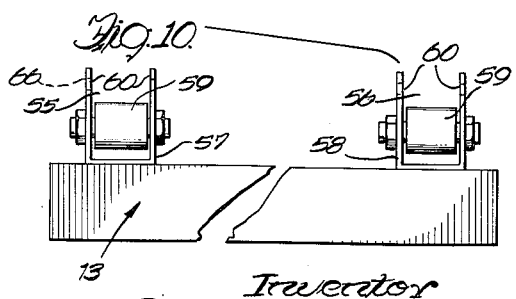
Inventor
Arthur P. Krueger
Carlson, Pitzner, Hubbard & Wolfe
Attorneys April 25, 1961 A. P. KRUEGER 2,981,210
SYSTEM OF TRANSPORT FOR TRAILERS
Filed Nov. 23, 1956 3 Sheets-Sheet 3
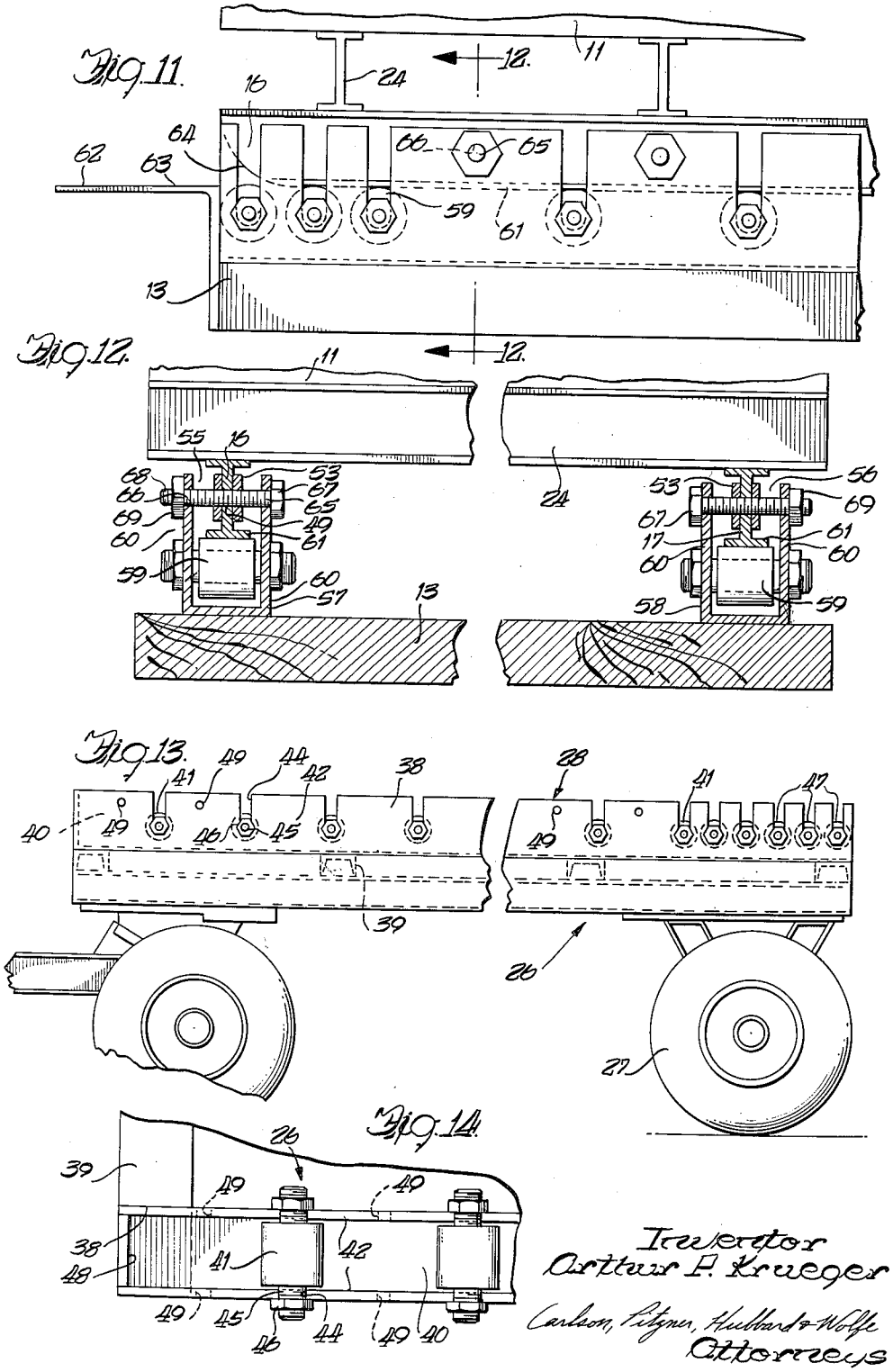

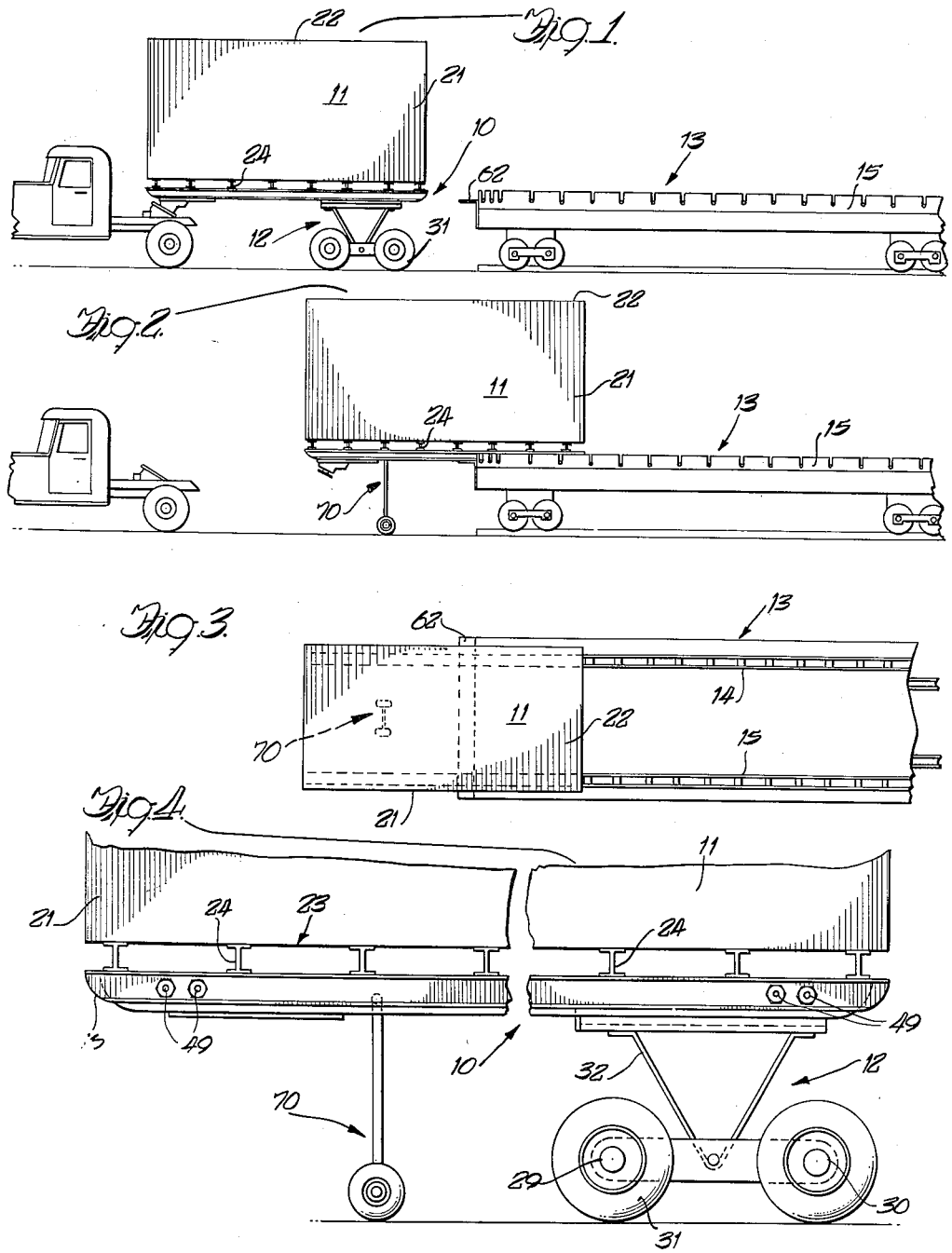

United States Patent Office 2,981,210
Patented Apr. 25, 1961

2,981,210

SYSTEM OF TRANSPORT FOR TRAILERS

Arthur P. Krueger, Chicago, Ill.
(Rte. 1, Box 339, Bristol, Wis.)

Filed Nov. 23, 1956, Ser. No. 624,026

7 Claims. (Cl. 105—368)

Heretofore a system for the shipment of goods has been known and used employing fleets of trailers and trains of railroad flat cars, where the trailers have been transported "piggy-back" over long distances on the flat cars and drawn in conventional fashion over streets and highways only for local pickup and delivery of the goods. Under the known system, the trailer is moved over the highway by means of a standard wheel and axle assembly fastened under it, and is driven, or lifted by a crane onto the flat car, and tied down by cables and elaborate tying devices during shipment over the rails. Upon arrival at the city of destination the local trucker drives the trailer from the railroad yards to deliver the goods.

Another system for the shipment of cargo has been proposed, involving the use of "trailerships" for transporting trailers long distances. In common with the "piggy-back" method, this system employs standard type trailers for transporting the cargo locally and the trailers are loaded onto the ship. Both systems offer rapid cargo handling as a principal feature.

However, while the known systems offer many advantages, considerable difficulty has been experienced in the case of the "piggy-back" method with obtaining a secure tying down of the trailer on the flat car during long distance shipment. Modern highways offer a relatively smooth ride when compared with the pitching of a vessel or with the tossing and sway of a hard ride on a flat car, due to rough stretches of road bed. In the case of the "piggy-back," the trailers are generally especially constructed of heavier and stronger materials so as to stand up under the rough treatment. These "piggy-back" trailers are thus ordinarily more expensive than standard trailers. Moreover, the hard ride the trailer receives requires elaborate tying down precautions to prevent the trailer from being pitched off the flat car. The high center of gravity of the loaded trailer contributes to the problem of adequately safeguarding the trailer body from being thrown off the flat car while the train is being drawn at high speeds over the rails. But even when careful precautions are taken, accidents have occurred throwing the trailer from the flat car and involving the consequent loss and destruction of valuable goods and merchandise carried in the trailer, as well as the trailer itself. Many of these same difficulties are to be expected in any method of ship transport of trailers.

It is a general object of the present invention to provide a system for transport of trailers where the trailer body is removable from its wheel and axle assembly, where means are provided for sliding the trailer body onto a cargo carrier, and where the trailer body may be safely secured to the carrier for long-distance shipment. While the present invention has as a general object the provision of a system for highway and railway transport of trailers, as will appear the system is also usable for air as well as water transport of trailers.

It is a more specific object of this invention to provide an arrangement of ways or guides on a cargo carrier, for receiving a trailer body having rails on its underside for sliding on the ways, and where the rails and ways are provided with an interlock for rigidly and safely fastening the trailer body to the carrier.

Another general object of the invention is to provide a trailer which is lighter, and which will withstand the severe abuse experienced in long-distance shipment by means of railroad flat car or other cargo carrier. It is a more specific related object to provide a trailer body with strengthening rails on its underside which brace the box-like frame, and which also serve the above-described function of providing means for sliding on ways or guides provided on the railroad flat car or other cargo carrier. Another object is to provide an improved wheel and axle assembly for the trailer body, and it is an object of this invention to provide means for removing the trailer body from such a wheel and axle assembly.

Other objects will appear from the following description taken in connection with the accompanying drawings, in which:

Figure 1 is a view, in elevation, of a railroad flat car equipped with roller ways and a trailer body provided with rails for sliding onto the flat car;

Fig. 2 is a view, in elevation, like Figure 1;

Fig. 3 is a plan view of the trailer body and railroad flat car as shown in Fig. 2;

Fig. 4 is an enlarged view of the trailer body shown in Figure 1 and illustrating the wheel and axle assembly;

Fig. 5 is an enlarged view, in plan, illustrating the construction of the floor and the means for fastening the wheel and axle assembly of the trailer body shown in Fig. 4;

Fig. 6 is an enlarged view taken in the plane of lines 6—6 of Fig. 5 and illustrating the dolly wheels;

Fig. 7 is an end view of the position of a trailer body shown in Fig. 5 and illustrates additional details of the fastening means for the wheel and axle assembly;

Fig. 8 is an enlarged view, in side elevation, showing the details of construction of the roller ways with which the railroad flat car of Fig. 1 is equipped;

Fig. 9 is an enlarged fragmentary view, in plan, showing details of a portion of the roller way shown in Fig. 8;

Fig. 10 is an enlarged end view of the roller way structure of Fig. 8;

Figs. 11 and 12 are enlarged fragmentary views illustrating means for interlocking a trailer body rail and railroad flat car way structure, of the type shown in Figure 1;

Fig. 13 is a view, in side elevation, of a truck bed for highway transport of a trailer body like that shown in Figure 1; and Fig. 14 is an enlarged fragmentary view, in plan, of certain constructional details of the truck bed shown in Fig. 13.

Referring to the drawings, a semi-trailer indicated by the general reference numeral 10 is shown in Figure 1 for purposes of illustrating the invention as a system of transport for trailers. In general, the system of this invention contemplates using a trailer of the type shown having a box-like trailer body 11, equipping the trailer body with a wheel and axle assembly means 12 for highway transport of the trailer body, and also providing means for removing the trailer body from the wheel and axle assembly and transferring it to a cargo carrier for long-distance shipment of the trailer body. In the present instance, as exemplary of a means for long-distance transport of the trailer body, a railroad flat car is shown. It is proposed to use an arrangement of rails and ways to enable sliding the trailer body onto the cargo carrier. As exemplary of the rail and way arrangement, ways 14, 15 (Fig. 3) are provided on the flat car for receiving the trailer body, and rails 16, 17 are mounted on the underside of the trailer body for sliding on the ways. It will be understood, however, that this form of the invention illustrated is exemplary only, and that other equivalent arrangements to facilitate sliding the trailer body onto any equivalent cargo carrier for long-distance transport, may be used as desired. Thus this or an equivalent slide arrangement might be used with a trailer body and water vessel or cargo airplane for a transport system. Furthermore, for safely securing the trailer body to the cargo carrier means are provided for interlocking the rails and ways.

Turning now to the constructional details of the illustrative trailer body 11 shown in Figure 1, it comprises a conventional box-like frame having side walls 21 and a top 22, and is rigidly braced by structural members in standard fashion. The floor 23 of the body 11 is comprised of cross members 24 covered with sheet metal plates or the like.

In the exemplary form of the invention illustrated, the longitudinal rails 16, 17 are fastened under and to the cross members 24 by weld or rivets or any equivalent fastening means, so as to provide means for sliding the trailer body 11 onto a railroad flat car 13. These longitudinal rails 16, 17 may be made of I-beam structural members as shown in Figs. 6, 7 and 12, and in addition to providing skids for the trailer body 11, also act as braces and lend rigidity to the box-like frame structure. In the manufacture of a trailer body 11 like that illustrated in Figure 1, a light, standard body could be used, the added rails 16, 17 thus strengthening the body for use under the severe strains of railway shipment. In the alternative, however, the trailer body could be especially made for such use. Trailers used for "piggy-back" service are ordinarily heavier and more extensively braced than standard trailers, in order to withstand the severe abuse experienced during travel over the rails. Due to the fact the trailer body of this exemplary form of the invention may be secured more adequately to the railroad flat car, and the center of gravity of the loaded unit is lower when in place on the flat car than with a standard "piggy-back" trailer, the strain on the trailer body frame is substantially less allowing the trailer body to be made lighter and with less elaborate bracing and consequently at less cost.

For highway transport of the trailer body illustrated in Figure 1, the present invention offers alternative means of transport. As shown in Figures 1 and 4–7, a wheel and axle assembly 12 may be used for transporting the body 11 over streets and highways. In the present instance the wheel and axle assembly 12 may be removably fastened to the trailer body 11. As an alternative means, shown in Figs. 13 and 14, the trailer body 11 may be transported by a truck bed 26 having permanently attached wheels 27, and equipped with a way structure 28 similar to the way structure shown on the railroad flat car illustrated in Figure 1.

For the wheel and axle assembly 12, shown in Figs. 4–7, adapted to be removably fastened to the trailer body 11, a relatively conventional construction may be used comprising as illustrated in the present instance, a pair of axles 29, 30 having standard truck wheels 31 mounted by means of a metal frame 32. This wheel and axle assembly 12 is standard with the exception that the frame 32 carries a locking plate 33 which is used for securing the wheel and axle assembly to the underside of the trailer body 11. To receive the locking plate 33, the underside of the trailer body 11, between the rails 16, 17, is provided with a metal mount 34 onto which the locking plate 33 clamps by means of flanged edges 35. For securing the locking plate 33 and the mount 34 together, bolts 36 may be used, extending through alined openings in the plate 33, and threaded to receive nuts 37 for holding the bolts in position.

It will be readily appreciated that for removing the trailer body 11 from the wheel and axle assembly 12, the bolts 36 are removed from the mount 34 and locking plate 33, and while the trailer body 11 is transferred onto the railway flat car 13, the wheel and axle assembly 12 may be dropped from the underside of the trailer body. The trailer body may then be slid onto the flat car, by means of a winch, the tractor used for hauling the trailer body, or by other means.

As an alternative method of local highway transport of the trailer body 11, it may be carried and moved locally by means of a truck bed 26 equipped with a wheel and axle assembly and adapted to be drawn by a tractor like a conventional highway semi-trailer. As shown in Figs. 13 and 14, the truck chassis 26 in the illustrative form of the invention shown, comprises a frame of channel members 38 rigidly cross braced by means of channel structural members 39. Of course, if preferred the chassis or truck bed 26 instead of being made for drawing by a tractor, may be made as a highway vehicle with its own power source. For receipt of the trailer body rails 16, 17, the truck bed 26 presents parallel ways 40. For this purpose, in the present instance, U-shaped channel members 38 are employed for supporting roller bearings 41 spaced the length of the longitudinal channel members. As a convenience for installing and maintaining the roller bearings 41 the opposite sides 42 of the channel members 38 are slotted 44 so that the shafts 45 of the bearings may be dropped into the slots and held at a proper level by means of frictional engagement of nuts 46 threaded in place on the ends of the bearing shafts. Any equivalent means for holding the bearings in place may be substituted as desired. In this form of the invention, the spacing of the rollers varies in a way 40, those rollers 47 spaced close to the trailing end of the chassis 26 being spaced relatively closer together than the remaining rollers in the series. This spacing arrangement is employed so that when the trailer body is slid onto the truck bed or chassis 26, the weight thereof is taken up gradually and distributed to the framing members. Stop plates 48 bridging the sides 42 of the channel members making up each way 40 at the front end of the truck bed 26 are employed to insure that the body of the trailer when it is slid onto the ways stops properly positioned thereon.

For securing the trailer body 11 in place on the truck bed 26, alined threaded openings 49 are provided in the sides 42 of the channel members 38 supporting the roller bearings, and in the rails 16, 17 on the trailer body itself. These openings are intended to receive locking members (not shown) in the present instance preferably in the form of bolts threaded to receive nuts for securing the members in place. The rails 16, 17 on the trailer body 11 may be reinforced in the region of these openings by plates 53, which may take the form of nuts welded on both sides of the rail flange. By fastening the cross rods rigidly and directly to the rails by way of the nuts 53, movement of the rails is prevented and stresses are relieved from the bearings.

Both the method of transport shown in Figs. 4–7, and embodying a removable unitary wheel and axle assembly 12, and the method of transport shown in Figs. 13 and 14 and involving the use of a truck bed or chassis 26 for transport of the trailer body 11, provide for local pick-up and delivery at the place of origin and destination of the goods shipped. Since the trailer may be drawn long distances over highways, this same trailer rig may be used for shipping into areas not serviced by railroads or where freight service is poor. It is contemplated, however, that the major use for the removable trailer body 11 is shipment over long distances by means of railroad flat cars 13, or by means of other relatively low cost long distance transport, such as by ships, either inland or intercoastal, or by cargo airplane.

With the illustrative arrangement of the invention shown, the trailer body 11 may be removed from the wheel and axle assembly of either form shown, and transferred to a railroad flat car 13 or equivalent means of long-distance transport. For purposes of explaining the invention, a railroad flat car 13 has been shown in Figs. 1–3, and 8–12, equipped to receive the trailer body 11. For receiving the trailer body 11, the railroad flat car 13 in the present instance has roller ways 55, 56, allowing the trailer body to slide by means of its rails 16, 17 onto the flat car 13. In the present instance, these roller ways 55, 56 (Fig. 10) are made of parallel U-shaped channel members 57, 58 fastened on the railroad flat car 13 for support of roller bearings 59 providing a slide way. The side walls 50 of the channel members 57, 58 are separated sufficiently to provide clearance (Fig. 12) with the flanges 61 of rails 16, 17 carried by the trailer body 11. These rails thus may be slid on the rollers 59 to position the trailer body 11 on the ways. As in the case of the provision of rails 16, 17 under the trailer body 11, the number of ways 55, 56 on the flat car may be varied as desired, the illustrative form chosen to illustrate the invention employs two parallel ways 55, 56 to match the two parallel rails 16, 17 of the trailer body 11. Conventional roller bearings may be used, in the exemplary form shown of standard construction and supported at a substantially uniform height above the deck of the flat car 13 and uniformly below the top edge of the channel sides 60 to provide an even guide or way structure.

So that the rails 16, 17 slide easily during the operation of transferring the trailer body 11 to or from the flat car 13, the end of the flat car receives an angle bracket 62 furnishing a shelf 63 even with the level of the way provided by the bearings 59 (both ends of the flat car may be so equipped). In addition, the rails 16, 17 carried by the trailer body at each end may be curved 64 like sled runners. Moreover, the rollers 47 are spaced apart lengthwise a convenient distance, and as shown, the spacing is preferably closer at the ends of the ways 55, 56 so as to provide for a gradual transfer of the weight of the trailer body as it slides either onto or from the flat car. Furthermore, the closer spacing at the end of the ways receiving the trailer body, insures a smoother action as the rails slide into place.

During periods of long-distance transport of the trailer body, the present invention contemplates that the rails 16, 17 on the underside of the body 11 and the ways 55, 56 on the railroad flat car 13 or equivalent means for transport, will be employed for safely securing the trailer body in place. For securing the trailer body on the flat car, the present invention provides means for interlocking the rails on the trailer body and the ways on the flat car. In the present instance (Figs. 11, 12), cross rods 65 are used, passed through alined interlock openings 66 in the opposite channel sides 60 of a single way, and the opening 49 in the rail received between them. The rods may be headed 67 on one end and threaded 68 on the other to receive a nut 69 to secure the cross rod in place. Furthermore, a plurality of such cross rods 65 may be used to insure safe interlock, as shown in Figs. 4 and 8, four of such are used, however the number may be adjusted to meet operating conditions, as desired. Since the channel members 57, 58 making up the ways 55, 56 may be bolted, riveted, or otherwise fastened throughout their length to the railroad flat car 13, an extremely secure arrangement is provided for tying down the trailer body 11. Stretches of rough road bed thus have no effect on the security of the trailer body. Moreover, the center of gravity of the body 11, even when loaded, is relatively low, and it may be securely and rigidly fastened throughout its length to the rails 16, 17 so that the means for interlocking the rails and ways absolutely insures that the trailer body will not be thrown into a field during such rough stretches of road bed.

In carrying out the method of transport of the invention, the trailer body 11 may be transferred from the removable wheels and axile assembly 12 using the dolly wheels 70 for temporary support, or a crane, or forklift truck, or loading dock may be used for bringing the trailer body 11 into position to be moved directly onto the flat car. In the process, the wheel and axle assembly may be dropped off and removed. At the destination of the trailer, the reverse procedure will allow the trailer body 11 to be transferred by means of the roller ways 55, 56 on the railroad flat car 13, onto the wheel and axle assembly which may be interlocked to fasten the same in place on the underside of the trailer body. Using the alternative form of the invention of Figs. 13 and 14, the trailer body 11 by winch or equivalent means may be slid directly from the railroad flat car 13 with or without an intervening support being used. Other expedients to facilitate transferring the trailer body 11 from its wheel and axle assembly, to the railroad flat car, and back to the wheel and axle assembly, will be apparent to those skilled in the art.

I claim as my invention:

1. In a system of transport for trailers, the combination comprising, a truck trailer body having a box frame, a plurality of laterally spaced longitudinal rails secured on the under side of the body and bracing the frame, a removable third wheel carried under the body adjacent the forward end for swivelly connecting the trailer body to a tractor, a wheel and axle assembly for local transport of the trailer body and adapted to be mounted under the same adjacent the rearward end, a cargo carrier for long-distance transport of the truck trailer body having a deck, a plurality of laterally spaced ways on the deck of the cargo carrier each comprising parallel channel members, and spaced rollers extending crosswise between the channel members and carried thereby to form a substantially even surface for receiving the rails, said trailer body being transferable from the wheel and axle assembly onto the cargo carrier by sliding the rails between the parallel channel members onto the rollers provided thereby, the rails on the underside of the truck trailer body giving longitudinal support thereto preventing sagging or buckling during such transfer, and an interlock for the rails on the truck trailer body and the ways on the carrier for securing the truck trailer body to the carrier during long-distance transport comprising cross rods rigidly connecting said channel members and rails and fastening the same against relative sidewise and vertical movement.

2. A system of highway and railway transport for trailers, comprising in combination, a trailer body having inner and outer pairs of parallel rails mounted on the underside thereof, a removable wheel and axle assembly for highway transport of the trailer body, means for fastening said wheel and axle assembly to the inner pair of rails, a railroad flat car having parallel upwardly facing open channels defining ways spaced to receive the outer pair of trailer body rails for sliding the trailer body onto the flat car, and means including a plurality of crossbolts connected between the opposite walls of each of said channels and rigidly fastened to the associated rail for interlocking the ways and rails against relative sidewise and vertical movement and securing the trailer body on the flat car during railway transport.

3. A semi-trailer body for railway and highway transport, comprising in combination, a box-like frame having members forming a floor and outer and inner pairs of parallel longitudinal rails mounted to said frame beneath said floor, means under the forward end of said frame for connecting said body to a tractor, means including a demountable wheel and axle assembly under the rearward end of said frame for supporting the body for highway transport, a plate joining said inner pair of rails and a member fastenable to said plate for locking said wheel and axle assembly to the body, said outer pair of rails comprising means for sliding said body onto the deck of a flat car upon removal of said wheel and axle assembly therefrom the railway transport of the body.

4. In a cargo carrier way structure for receiving a trailer body for long-distance transport, said trailer body having a box-like frame and longitudinal flat rails under and extending below each side of the frame, the combination comprising, means providing longitudinal sliding ways supported on the cargo carrier including parallel upwardly facing open channel members each having side walls spaced to receive said rails and transverse rollers spaced along each of said members and supported bridging the side walls thereof, and means for rigidly interlocking said rails and ways against relative movement, comprising a plurality of crossbolts connected between the opposite side walls of each of said channel members rigidly fastened to said rails so as to interlock the channel members and rails against relative sidewise and vertical movement and support the weight of said body directly on said channel members, and secure said trailer body on the cargo carrier during long-distance transport.

5. In a railroad flat car structure for receiving a trailer body for railway transport, said trailer body having a box-like frame and a pair of longitudinal flat wide rails one under each side of the frame, the combination comprising, a pair of parallel upwardly facing open channel members arranged to receive said rails extending longitudinally of the flat car and supported thereon, each said channel member having side walls spaced the width of said rails, a row of rollers extending crosswise between the side walls of each of said channel members and carried thereby to form a substantially even way for receipt of the trailer body rails, and means for rigidly interlocking said rails and said ways against relative vertical and sidewise movement comprising crossbolts connected between the opposite side walls of each of said channel members and rigidly fastening the latter and said rails so as to support the weight of said body directly on said channel members and secure the trailer body on the flat car during railway transport.

6. In a system of highway and railway transport for trailers, the combination comprising, a trailer body having a frame and inner and outer pairs of longitudinal rails fastened on the underside of said frame and extending below the body, a removable third wheel carried under the body adjacent the forward end for swivelly connecting the trailer body to a tractor, a removable wheel and axle assembly for highway transport of the body, means for fastening said wheel and axle assembly to the inner pair of rails adjacent the rearward end of the body, a railway flat car, ways for the trailer body rails mounted on said flat car including upwardly facing open channels spaced to receive the outer pair of rails on the trailer body, each of said open channels having side walls, a row of rollers carried in said channels between said side walls, said trailer body being slidable from the wheel and axle assembly onto said flat car via the rails and ways for railway transport of the body, and means including a plurality of cross bolts connected between the opposite walls of each of said channels and rigidly fastened to said rails so as to secure said channels and rails against relative sidewise and vertical movement, for supporting the weight of said body directly on said channels.

7. In a railroad flat car way structure for receiving a trailer body for railway transport, said trailer body having a longitudinal channel forming a rail under each side thereof, the combination comprising, parallel upwardly facing open U-shaped channel members extending longitudinally of the flat car and supported thereon so as to receive said rails, each said channel member having spaced side walls, a row of rollers mounted in each channel member extending crosswise between the sidewalls thereof and carried thereby to form a substantially even way for receipt of the trailer body rails, the rollers adjacent the ends of the ways being spaced together relatively closer than the rollers intermediate the ends of the ways, for providing a gradual take-up of the weight of the trailer body as it slides onto the ways, and means for interlocking said rails and said ways comprising cross bolts connected between the opposite side walls of each of said channel members and rigidly fastened to said rails so as to secure the rails and channel members against relative sidewise and vertical movement, for securing the trailer body on the flat car during railway transport.

References Cited in the file of this patent

UNITED STATES PATENTS

| | | |
|---|---|---|
| 283,947 | Augspath | Aug. 28, 1883 |
| 387,632 | Dustin | Aug. 14, 1888 |
| 1,578,024 | Greenleaf | Mar. 23, 1926 |
| 1,716,664 | Prince | June 11, 1929 |
| 1,835,133 | Bergen | Dec. 8, 1931 |
| 1,843,988 | Randall | Feb. 9, 1932 |
| 1,921,605 | Canfield | Aug. 8, 1933 |
| 1,989,920 | Fildes | Feb. 5, 1935 |
| 2,021,503 | Fildes | Nov. 19, 1935 |
| 2,123,424 | Kellett | July 12, 1938 |
| 2,156,282 | Fitch | May 2, 1939 |
| 2,223,275 | Valenzuela | Nov. 26, 1940 |
| 2,444,297 | Kellett | June 29, 1948 |
| 2,691,450 | Rosenbaum | Oct. 12, 1954 |
| 2,699,735 | Williams | Jan. 18, 1955 |
| 2,703,659 | Hutchins | Mar. 8, 1955 |
| 2,756,073 | Bridge | July 24, 1956 |
| 2,767,661 | Tennant | Oct. 23, 1956 |